(12) United States Patent
Franke et al.

(10) Patent No.: US 8,075,809 B2
(45) Date of Patent: Dec. 13, 2011

(54) METHOD FOR PRODUCTION OF A BAND WITH SEVERAL PARALLEL OPTICAL FIBERS

(75) Inventors: Martin Franke, Berlin (DE); Tobias Happel, Berlin (DE); Andre Matthias Kwiatek, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 375 days.

(21) Appl. No.: 11/921,074

(22) PCT Filed: May 23, 2006

(86) PCT No.: PCT/EP2006/062512
§ 371 (c)(1),
(2), (4) Date: Nov. 27, 2007

(87) PCT Pub. No.: WO2006/125773
PCT Pub. Date: Nov. 30, 2006

(65) Prior Publication Data
US 2009/0230578 A1      Sep. 17, 2009

(30) Foreign Application Priority Data
May 27, 2005   (DE) .................. 10 2005 025 121

(51) Int. Cl.
*B29D 11/00*    (2006.01)
*G02B 6/44*     (2006.01)
*G01B 11/00*    (2006.01)

(52) U.S. Cl. ........ 264/1.24; 264/1.27; 264/408; 385/13; 385/106

(58) Field of Classification Search .................. 264/1.24, 264/406, 408, 1.27; 385/13, 106
See application file for complete search history.

(56) References Cited

U.S. PATENT DOCUMENTS

| | | | |
|---|---|---|---|
| 5,321,257 A | 6/1994 | Danisch | |
| 5,633,494 A | 5/1997 | Danisch | |
| 6,077,462 A * | 6/2000 | Lundin et al. ................ 264/1.24 |

(Continued)

FOREIGN PATENT DOCUMENTS
WO    2006/032654 A2    3/2006

OTHER PUBLICATIONS

European Office Action issued Sep. 21, 2009 in the European Application 1 792 215 A0.

(Continued)

*Primary Examiner* — Yogendra Gupta
*Assistant Examiner* — Jeremiah Smith
(74) *Attorney, Agent, or Firm* — Staas & Halsey LLP

(57) ABSTRACT

In a method for the production of optical bands with several optical fibers, the surface of the optic fibers in said bands is treated such as to increase the optical damping in sections of the optic fibers. The generated damping may be reliably adjusted, whereby during (or after) the processing of the surfaces a measuring light is introduced into the fiber optic and the light output at the other end of the band is measured by means of a sensor such as a CCD camera. Possible production errors can thus be compensated for during the production process, for example, by an increased process time for the optic fiber. Optical sensor bands can be produced by the above method for application in the bumpers of motor vehicles as recognition sensors for the impact of a pedestrian. Other applications in which the bending of a sensor band is to be determined by optical means are also envisaged.

8 Claims, 1 Drawing Sheet

U.S. PATENT DOCUMENTS

| | | |
|---|---|---|
| 6,522,808 B1 * | 2/2003 | Burt et al. .................. 385/37 |
| 2002/0057859 A1 | 5/2002 | Walter |
| 2004/0028372 A1 * | 2/2004 | Nagayama et al. ........... 385/147 |
| 2005/0058422 A1 * | 3/2005 | Doss et al. .................. 385/137 |
| 2006/0093265 A1 * | 5/2006 | Jia et al. .................. 385/37 |

OTHER PUBLICATIONS

European Office Action mailed Sep. 21, 2009 in corresponding European Patent Application 06 755 282.8.

* cited by examiner

METHOD FOR PRODUCTION OF A BAND WITH SEVERAL PARALLEL OPTICAL FIBERS

CROSS REFERENCE TO RELATED APPLICATIONS

This application is based on and hereby claims priority to PCT Application No. PCT/EP2006/062512 filed on May 23, 2006 and German Application No. 10 2005 025 0121.8 filed on May 27, 2005, the contents of which are hereby incorporated by reference.

BACKGROUND

The invention relates to a method for the production of a band with a plurality of parallel optical fibers, in which sections of the surface of the optical fibers are treated in such a way that the optical damping of the optical fibers is increased in the treated sections.

For example, such a method is disclosed by U.S. Pat. No. 5,321,257. For example, the surface of the optical fibers used in the band can be changed by heat forming, where, for example, three of these optical fibers can be connected to form a band. If the surface-treated sections of the optical fibers are in different alignment to one another with respect to the respective cross section of the optical fibers, then, if the band is bent, the curvature of the band in three dimensional space can be determined from the bending dependent, changing damping in the optical fibers. For this, the surface-treated areas of the respective optical fibers are used, since the bending dependent change of the damping is particularly strong here. The change in the intensity of light signals sent through the optical fibers can be determined and can be evaluated with regard to a damping change of the optical fibers.

US/2002/0057859 A1 discloses a method, in which an optical fiber can be fed to any process via a roll. This process may be a production process for the subsequent further processing of the optical fiber or, for example, a process in which the optical fiber is laid in situ. To be able to optically monitor the process, a sensor section is inserted into the optical fiber prior to rolling off of the optical fiber, and a measuring light is fed into the optical fiber in the process of being rolled off. The optical response which is reflected by the sensor section of the optical fiber is read again at the feeding-in location of the measuring light and evaluated with regard to the statements of interest of a quality control.

SUMMARY

One possible object is to provide a method for the production of a band with a plurality of parallel optical fibers, in which a surface treatment can easily be performed in such a way that a comparatively consistent optical behavior of the bands produced can be created.

The inventors propose that a measuring process is conducted during the treatment of the surface of the optical fibers, in which process the spatial course of the band is prescribed at least in the treated sections, at one end of the band measuring light is introduced into the treated optical fibers in each case at equal intensity and the output measuring light is recorded at the other end of the band, wherein an intensity band is defined for the intensity of the output measuring light and, in the case that the intensity of the output measuring light of an optical fiber lies outside the intensity band, the treatment is continued until the measuring light lies within the intensity band, or the treatment is discontinued and the band is discarded if an intensity of the measuring light cannot be established in the intensity band. By performing the measuring process during the method it is guaranteed that the increased damping in the optical fibers due to the treatment of the surface can already be quantitatively checked during the production process. Due to this it becomes possible in the case of production inaccuracies to make a suitable correction of the damping properties by a further treatment step. The spatial prescription of the course of the band is of primary importance during the optical checking of the damping, since the damping properties of the optical fibers vary strongly depending on their curvature (because the surface is treated in sections for this purpose). By the determination of the spatial course during the optical checking of the damping properties, reproducible measuring conditions are created in this way. Preferably, the band can be fixed onto a flat base, so that the band is without a curvature during the optical checking. Alternatively, the band can also be led over a roll during the optical checking, so that the band has a constant radius of curvature during the checking.

Thus, using the proposed method, a quality control of the surface treatment of optical fibers in a band can advantageously be performed at a time close to production. Possible defects can thus be detected early and be corrected, should the occasion arise. Furthermore, it is possible to sort out rejects, so that in this case further steps in the method for further working on the optical fiber do not occur and the associated production costs can be saved.

It is provided that the measuring step occurs during the treatment of the surface of the optical fibers. In this case it is possible to determine production defects during their creation and thus advantageously undertake a correction at the earliest possible point in time. In particular, it is also possible to find possible damage to neighboring optical fibers during the surface treatment of an optical fiber, since in this case the damping of optical fibers which are not being worked on would also increase. In this case, the defective component could be sorted out.

According to one embodiment, the band is cut into product-specific lengths before the treatment. Advantageously, this provides the possibility of already determining the damping properties of the untreated optical fibers in the band with the product-specific length by an optical check, to detect possible material defects in the optical fibers. In the subsequent surface treatment of the optical fibers, the already described procedure can be followed.

According to another embodiment, it is provided that the band is rolled off at one end from a roll for the surface treatment, with the other end of the band located on the roll being freely accessible for the introduction or output of measuring light. For example, this can be achieved by the band end that is situated on the roll being led into a central cavity of the roll and by the optical transmitter for transmitting and the optical receiver for receiving the measuring light also being situated in this cavity. During the production of the band, the optical fiber can then be pulled off from the storage roll, with the untreated fiber optics in the band having low optical damping compared to the sections included by the surface treatment. Therefore, the change of the damping properties due to the surface treatment can also be determined if a cutting of the band to product-specific lengths only occurs after the surface treatment of the optical fibers contained in the band.

To improve the accuracy of the measurement results in the last mentioned procedural variant during the optical checking of the band located on the roll, it can advantageously be provided that, during the evaluation of the recorded measuring light, a correction factor, dependent on the length of the band located on the roll, is considered. The correction factor can take account of the degree of damping of the band located on the roll and so it is dependent on the length still available on the roll. The measurement result is corrected by this factor, which has the advantage that the measurement results in the production of the product-specific band parts which are to be cut to length can be compared directly amongst themselves, independently of how much band is still left on the roll.

According to a particularly advantageous embodiment of the proposed method, it is provided that the optical end surfaces of the optical fibers are worked on before the measuring step. In this manner, the transmission quality at the ends of the band can be improved. Furthermore, the measurement results for the bands become advantageously comparable amongst themselves, since the spread of the measured values due to the varying losses at the ends of the optical fibers is decreased. Furthermore, the improvement of the transmission properties of the optical end surfaces will in general also be advantageous for the application for which the bands are intended. For example, it could be optical sensor bands, as are built into the bumpers of motor vehicles for pedestrian protection systems.

Lastly, it is advantageous if a sensor surface which is big enough to image the measuring light of all the optical fibers simultaneously is used to record the measuring light. For example, this sensor surface may be a CCD sensor or a comparable optical area sensor, which may preferably be formed as part of a digital camera. By using the sensor surface, it is ensured that the measuring light output from the optical fibers is recorded simultaneously and thus directly comparably. In particular, it is possible to display an intensity distribution of the measuring light by an appropriate evaluation of the measured image on the sensor.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
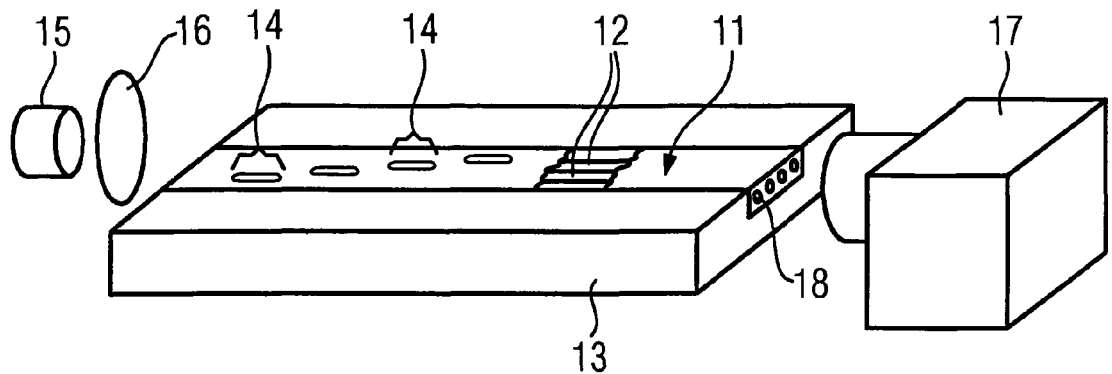
FIG. 1 shows a setup to carry out an exemplary embodiment of the method according to the proposed method in which the band is cut to length before the treatment.

Reference will now be made in detail to the preferred embodiments of the present invention, examples of which are illustrated in the accompanying drawings, wherein like reference numerals refer to like elements throughout.

According to FIG. 1, a band 11 which has already been cut to length with reference to the planned use is illustrated in a partly broken open fashion and contains four optical fibers 12, which have been cast into the material of the band 11. The band lies in a carrier body 13, by which its course is set. The carrier body 13 is arranged in such a fashion, that the band 11 fits exactly into a groove provided for this purpose and therefore lies without a curvature. A surface treatment of the optical fibers 12 is conducted in each of the sections 14 by a laser, which is not illustrated and changes the surface of the optical fibers 12 in such a way that the damping of the optical fibers as such or a damping dependence on the bending of the optical fiber is increased in the sections 14. In this case the material of the band 11 is pierced by the laser and, depending on the nature of the material is destroyed, so that the damage to the band has to subsequently be filled by a filling material (not illustrated).

Preferably during (or after) the surface treatment, measuring light is introduced into the optical fibers 12, by a light source 15, for example a light-emitting diode or a laser diode, via refractive optics 16, and the light which is output at the opposite end of the band is read by a CCD camera 17. The measuring light in each case passes through the polished end surfaces 18 (these are only visible on the exit side) of the optical fibers, which are polished to improve the transmission. Between the illustrated end surfaces 18 and the CCD camera 17 a filter (not illustrated) can additionally be provided, which filters the measuring light of unwanted light parts (such as the light of the surroundings).

Figure 2:
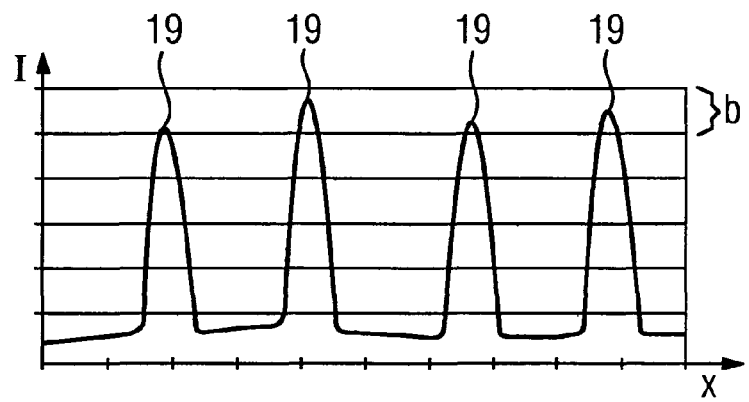
FIG. 2 shows the intensity distribution of the measuring light in an exemplary manner, recorded by a camera according to FIG. 1

FIG. 2 schematically shows an evaluation of the image recorded with the CCD camera 17 according to FIG. 1 of the light output from the band 11 (distribution of the light intensity I against a spatial variable x). The four intensity maxima 19, which characterize the light intensity of the light transmitted through the optical fibers 12 can be seen. These are contained in a intensity band b, which was defined for a particular application, so that a correction of the damping properties produced by the surface treatment of the optical fibers 12 is only required if the intensity maxima 19 lie outside the intensity range defined by the band b. An illustration according to FIG. 2 is obtained if the image created by the CCD camera according to FIG. 1 is evaluated by using software.

Figure 3:
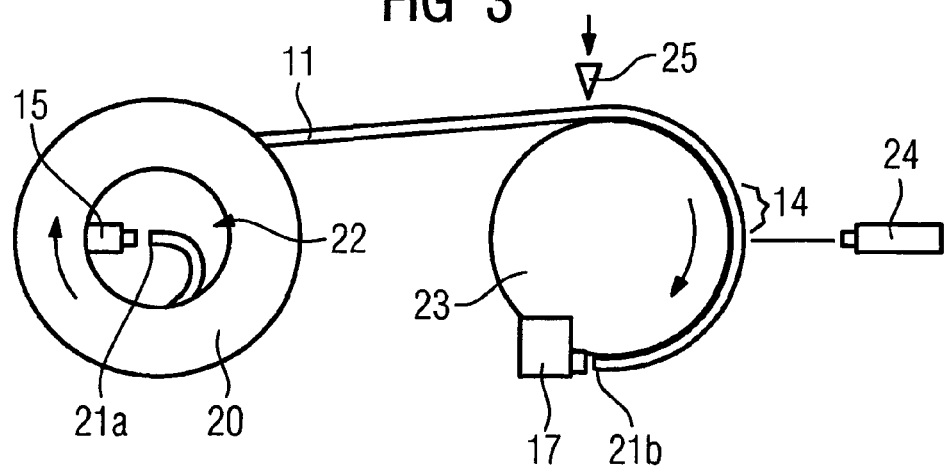
FIG. 3 shows a setup to carry out a further exemplary embodiment of the method according to the proposed method in which the band is rolled off from a roll.

In FIG. 3, the semi finished band 11 is rolled up on a storage roll 20. The end 21a of the band which is located on the roll does not lie on top of the roll cylinder, instead it is led into a cylindrical cavity 22 of the roll. The light source 15 is also fitted here, so that light can be introduced into the optical fibers (not illustrated in greater detail) independently of the angular position of the storage roll 20.

To carry out the method, the band 11 is unwound from the storage roll 20 with its free end 21b and is led over a production roll 23. By a laser 24, the optical fibers are treated, for example in section 14 (illustrated exemplary in FIG. 3). The progress of the treatment procedure can be simultaneously checked, by feeding measuring light into the band 11 by the light source 15 and recording the light which is output from the band 11 by a stationary CCD camera mounted on the production roll. If the required damping properties are present and the product-specific band length is reached, the produced band part can be cut to length by a suitable apparatus 25.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for the production of an optical band, comprising:
    providing a band having a plurality of parallel optical fibers disposed therein;
    introducing light into a first end of the band, thereby providing light to each of the individual optical fibers and simultaneously measuring the individual output intensity of light emitted by each of the individual optical fibers from a second end of the band;

while light is being introduced into the optical fibers, initiating a process to damage a surface of each optical fiber at a section in such a way that an optical damping of the respective optical fiber is increased in the treated section in a first treatment step;

for each optical fiber, if the intensity of the output light of said fiber exceeds a defined intensity band, continuing to damage the surface in a further treatment step until the intensity of the output light decreases sufficiently to lie within said defined intensity band; and discontinuing damaging the surface and discarding the band if the intensity of the output light decreases below the intensity band.

2. The method as claimed in claim 1, wherein the band is cut into product-specific lengths before initiating a process to damage the surface of each optical fiber.

3. The method as claimed in claim 1, wherein a band precursor is rolled on a containment roll with the first end being freely accessible for introducing light or measuring output light, and the band precursor is partially rolled off the roll for initiating a process to damage the surfaces of the fibers.

4. The method as claimed in claim 3, wherein, the intensity of output light is measured while the band precursor is partially rolled on the roll, and a correction factor, dependent on a length of the band precursor remaining on the roll, is considered when evaluating the intensity of output light.

5. The method as claimed in claim 1, further comprising: treating optical end surfaces of the optical fibers before measuring the intensity of output light.

6. The method as claimed in claim 1, wherein a sensor having a sensor surface is used to measure the intensity of output light, and the sensor surface is big enough to simultaneously image output light from all of the optical fibers.

7. The method as claimed in claim 4, further comprising: treating optical end surfaces of the optical fibers before measuring the intensity of output light.

8. The method as claimed in claim 7, wherein a sensor having a sensor surface is used to measure the intensity of output light, and the sensor surface is big enough to simultaneously image output light from all of the optical fibers.

* * * * *